(12) United States Patent
Schuette et al.

(10) Patent No.: US 8,405,252 B2
(45) Date of Patent: Mar. 26, 2013

(54) METHOD FOR SYNCHRONIZING AN ELECTRIC MACHINE WITH AN ELECTRIC GRID AND ARRANGEMENT OF AN ELECTRIC MACHINE AND AN ELECTRIC GRID

(75) Inventors: Thomas Schuette, Untersiggenthal (CH); Roland Hug, Altendorf (CH)

(73) Assignee: Alstom Technology Ltd, Baden (CH)

( * ) Notice: Subject to any disclaimer, the term of this patent is extended or adjusted under 35 U.S.C. 154(b) by 239 days.

(21) Appl. No.: 12/833,564

(22) Filed: Jul. 9, 2010

(65) Prior Publication Data
US 2011/0163607 A1    Jul. 7, 2011

(30) Foreign Application Priority Data
Jul. 10, 2009   (EP) .................................. 09165236

(51) Int. Cl.
*H02J 1/00*         (2006.01)

(52) U.S. Cl. ........................................ 307/87
(58) Field of Classification Search .............. 307/85, 307/87
See application file for complete search history.

(56) References Cited

U.S. PATENT DOCUMENTS
4,031,407  A  *  6/1977  Reed ................ 307/87
5,754,033  A  *  5/1998  Thomson .......... 322/45
2005/0248308  A1   11/2005  Reed et al.
2009/0108676  A1 * 4/2009  Algrain ............ 307/73

FOREIGN PATENT DOCUMENTS
AT        286 459 B          12/1970
DE        709 686 C           8/1947
WO    WO 2005/112248 A1     11/2005

OTHER PUBLICATIONS

European Search Report dated Jan. 18, 2010.
Donald A. Voltz et al., "Are There Risks Associated With Testing Turbine-Generator Sets Prior to Acceptance?Mr. Murphy Thinks So", Petroleum and Chemical Industry Technical Conference, Sep. 13, 2004, pp. 249-258.

* cited by examiner

*Primary Examiner* — Daniel Cavallari
(74) *Attorney, Agent, or Firm* — Buchanan Ingersoll & Rooney PC

(57) ABSTRACT

A method is provided for synchronizing an electric machine with an electric grid. The method includes synchronizing the frequency of a generator with a frequency of the grid, and regulating the voltage of the generator towards the voltage of the grid, by connecting the generator to the grid when the voltage of the generator reaches a first voltage value lower than the grid voltage. The present disclosure also provides arrangements of an electric generator and an electric grid.

16 Claims, 2 Drawing Sheets

METHOD FOR SYNCHRONIZING AN ELECTRIC MACHINE WITH AN ELECTRIC GRID AND ARRANGEMENT OF AN ELECTRIC MACHINE AND AN ELECTRIC GRID

RELATED APPLICATIONS

This application claims priority under 35 U.S.C. §119 to European Patent Application No. 09165236.2 filed in Europe on Jul. 10, 2009, the entire content of which is hereby incorporated by reference in its entirety.

FIELD

The present disclosure relates to a method for synchronizing an electric machine with an electric grid, and an arrangement of an electric machine and an electric grid.

In the following, reference to a generator will be made, but it is clear that the method and arrangement of the present disclosure may also be used with different electric machines, such as electric motors, for example.

BACKGROUND INFORMATION

With reference to FIG. 1, in order to correctly connect synchronous machines such as electric generators 1 to an electric grid 2, a synchronizer 3 is provided that measures (via measuring transformers 4, 5) the voltage, frequency and phase of the generator 1 and grid 2, and causes a breaker 6 to connect them to each other only when these parameters are as close to each other as possible.

In other words, as shown in FIG. 4, which shows the voltage V of the generator (continuous line 10) and grid (dashed line 11) with respect to time t, the breaker is closed when the curves 10 and 11 overlap one another.

Nevertheless, during erection or maintenance of the system, there is a risk that the electric conductors 7 connecting the generator 1 to the breaker 6 or also the conductors of the measuring transformers 4, 5 are interchanged.

If this occurs, when the generator 1 and the grid 2 are connected to one another, even if the synchronizer 3 measures the same voltage, the same frequency and the same phase between the generator 1 and grid 2, the phase is actually not the same, but is switched in the worst case by 120° (three phase voltages).

In other words, as shown in FIG. 3, which shows the voltage of the generator 1 (continuous line 10) and grid 2 (dashed line 11) with respect to time, in case the electric conductors 7 or the conductors of the measuring transformers 4, 5 are interchanged, when the breaker 6 is closed, the voltage and frequency are the same, but the phase is shifted by 120° ("faulty synchronizing").

This difference in phase causes the shaft of the generator 1 to undergo a large torque impact when the breaker 6 is closed, which tends to bring the generator shaft in phase with the grid.

Therefore, the shafts of synchronous machines such as generators are designed to withstand such a large torque impact.

SUMMARY

An exemplary embodiment provides a method for synchronizing an electric machine with an electric grid. The exemplary method includes synchronizing a frequency of a generator with a frequency of the grid, and regulating a voltage of the generator towards a voltage of the grid by connecting the generator to the grid when the voltage of the generator reaches a first value lower than the voltage of the grid.

An exemplary embodiment provides an arrangement of an electric machine and an electric grid. The exemplary arrangement includes a breaker interposed between the electric machine and the electric grid, a generator, and a synchronizer connected to the generator upstream of the breaker and to the electric grid downstream of the breaker via measuring transformers. The synchronizer is connected to the generator to drive the generator, and the measuring transformers are two different measuring transformers.

An exemplary embodiment provides an arrangement of an electric machine and an electric grid. The exemplary arrangement includes a breaker interposed between the electric machine and the electric grid, a generator, and a synchronizer connected to the generator upstream of the breaker and to the electric grid downstream of the breaker via measuring transformers. The synchronizer is connected to the generator to drive the generator. The exemplary arrangement also includes an automatic voltage regulator that at least one of includes and is connected to a memory configured to store a voltage. The automatic voltage regulator is configured to drive the generator such that a voltage of the generator is as close as possible to the voltage stored in the memory.

An exemplary embodiment provides an arrangement of an electric machine and an electric grid. The exemplary arrangement includes a breaker interposed between the electric machine and the electric grid, a generator, and a synchronizer connected to the generator upstream of the breaker and to the electric grid downstream of the breaker via measuring transformers. The synchronizer is connected to the generator to drive the generator. The synchronizer includes a control unit and a memory at least one of connected and embedded in the control unit. The memory is configured to store a first voltage value. The control unit of the synchronizer is configured to cause the breaker to connect the generator to the grid when a voltage of the generator reaches the first voltage value lower than the voltage of the grid.

BRIEF DESCRIPTION OF THE DRAWINGS

Additional refinements, advantages and features of the present disclosure are described in more detail below with reference to exemplary, non-limiting embodiments illustrated in the drawings, in which.

DETAILED DESCRIPTION

Figure 1:
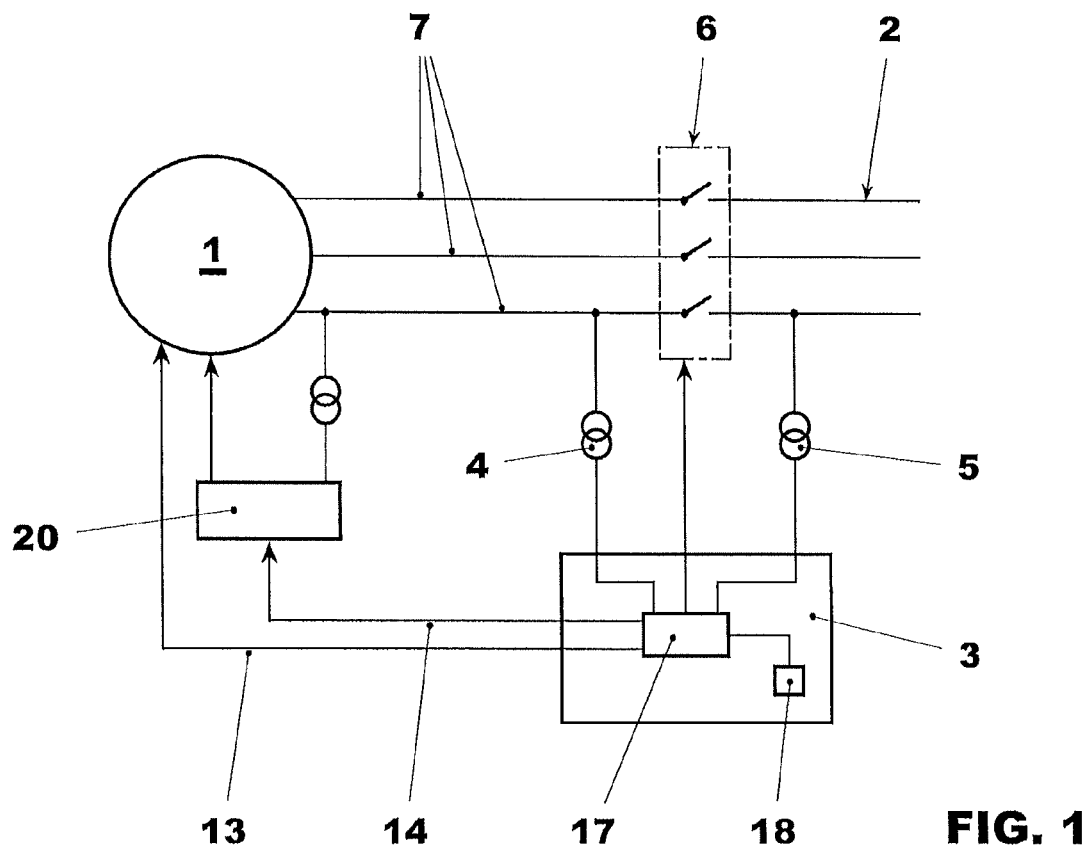
FIG. 1 is a schematic view of a generator and a grid to be connected together.

Exemplary embodiments of the present disclosure provide a method and an arrangement which reduce the occurrence of the above-noted problems.

For example, exemplary embodiments of the present disclosure provide a method and an arrangement which enable the torque impact on the shaft of the synchronous machine (such as a generator), in case of faulty synchronising, to be low. For example, the exemplary method and arrangement provide that the torque impact is lower than that with traditional synchronizing methods.

Another exemplary embodiment of the present disclosure provides a method and an arrangement which enable the synchronous machine shaft to be smaller and withstand lower torque than in conventional techniques.

The generator 1 driven by a motor (for example, a gas or steam turbine) rotates, but it is not connected to the grid 2. In other words, the breaker 6 (for example, having three poles) is open.

The voltage of the generator 1 is different from that of the grid and its frequency and phases are also different from those of the grid 2.

According to an exemplary embodiment, before the breaker 6 is closed and the generator 1 is connected to the grid 2, the generator 1 should be synchronized with the grid 2.

According to an exemplary embodiment, a method for synchronizing the electric generator 1 with the electric grid 2 includes the steps of synchronizing the frequency of the generator 1 with the frequency of the grid 2.

In this respect, the synchronizer 3 measures, via the measuring transformers 4, 5, the frequency of the generator 1 and grid 2, and drives the generator 1 (via a control line 13) in order to make the frequency of the generator 1 equal to that of the grid 2.

In the drawings, for clarity of illustration, the transformers 4, 5 are shown to be only connected to a conductor 7 or a single phase of the grid 2. However, it is to be understood that this is a schematic, exemplary illustration, and this connection may be implemented to one or more conductors or phases as appropriate.

During, before or after this step, the voltage of the generator 2 is increased towards the voltage of the grid 2.

In this respect, the synchronizer 3 (via the transformers 4, 5) also measures the voltages of the generator 1 and grid 2, and drives an AVR 20 (Automatic Voltage regulator) via a control line 14 so as to increase the voltage of the generator 1.

Figure 2:
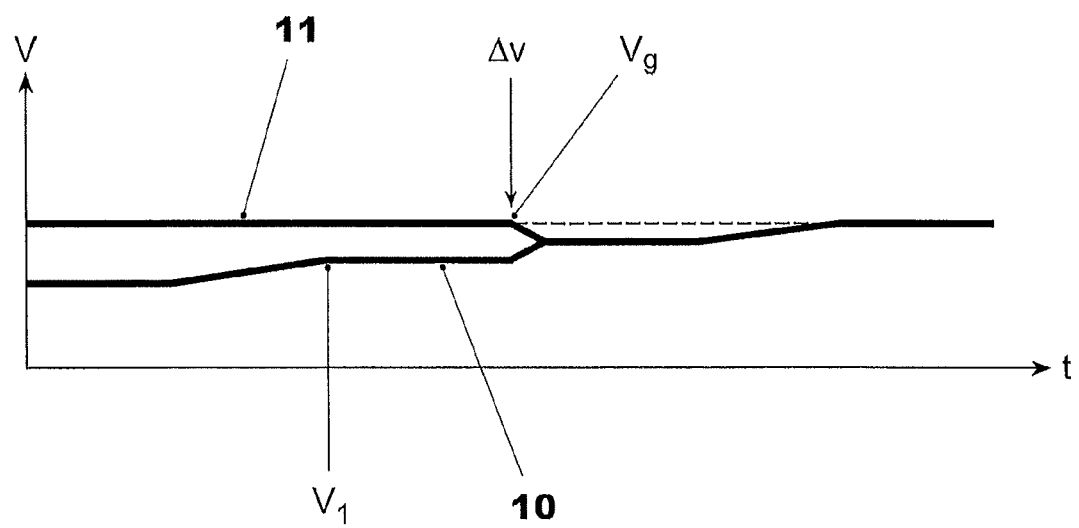
FIG. 2 is a diagram showing the course of the generator and grid voltage before and after mutual connection.
Figure 3:
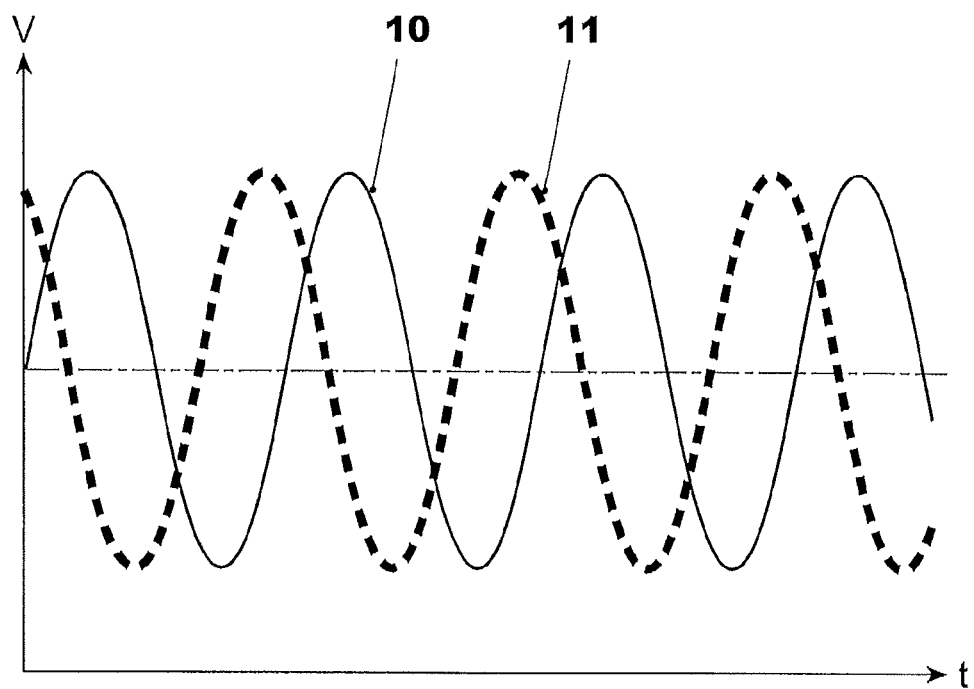
FIGS. 3 and 4 are two diagrams showing the course of the voltage, frequency and phase of the generator and grid with respect to time, before mutual connection, respectively, in case of faulty synchronizing and synchronizing.
Figure 4:
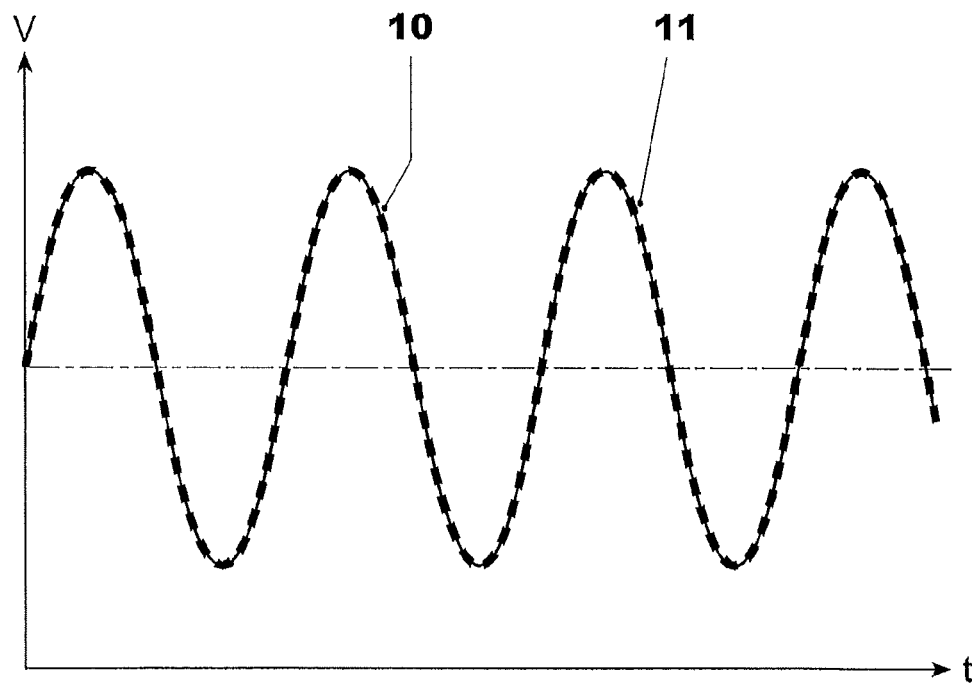

As shown in FIG. 2, the voltage of the generator 1 is increased up to a first value $V_1$ lower than the voltage $V_g$ of the grid 2, such that at the end of this step a difference $\Delta v$ exists between the voltage of the generator 1 and the voltage of the grid 2.

When the voltage of the generator 1 reaches the first value $V_1$ and the generator phase is the same as the grid phase (measured by the synchroniser via the transformer 4, 5), the breaker 6 is closed and the generator 1 is connected to the grid 2.

In case the connector 7 or the conductors of the measuring transformers 4, 5 have been interchanged with one another, when the breaker 6 is closed, a difference between the generator phase and the grid phase exists (this difference being 120°); this causes the shaft of the generator to undergo a torque impact.

Nevertheless, according to an exemplary embodiment of the method of the present disclosure, the torque impact on the shaft in case of faulty synchronizing is much lower than with traditional methods.

For example, the phase of the generator 1 can be synchronized with the phase of the grid 2 after the voltage of the generator 1 has reached the first value $V_1$ and before the generator 1 has been connected to the grid 2.

After the generator 1 has been connected to the grid 2 (see FIG. 2), the voltage of the generator 1 can be increased up to the original voltage of the grid 2.

The first voltage value $V_1$ is lower than the grid voltage $V_g$ by between 5-20%, for example between 10-15%.

Simulations demonstrated that these ranges enabled the torque impact on the shaft to be sensibly reduced in case of faulty synchronizing (with 120° phase shifting), while still guaranteeing the safe operation of the generator 1 and grid 2.

According to an exemplary embodiment, the method of the disclosure may be implemented using two different measuring transformers 4, 5.

For example, the transformers 4, 5 can provide the same secondary voltage (for example, 100 V) with different primary voltages (for example, if the grid has 15000 V, the primary voltage of the measuring transformer 4 could be 14000 V and that of the measuring transformer 5 could be 15000 V).

Accordingly, the measuring transformers 4, 5 can provide the same secondary voltage with different primary voltages, where the primary voltage of the measuring transformer 4 connected to the generator 1 is smaller than that of the measuring transformer 5 connecter to the electric grid 2.

In accordance with other exemplary embodiments of the present disclosure, the method of the may be implemented with the AVR 20 (Automatic Voltage Regulator) provided with or connected to a memory wherein the $V_1$ voltage is stored.

In this case, the AVR, instead of driving the generator such that its output voltage is as close as possible to the grid voltage $V_g$, drives it such that its voltage is as close as possible to the $V_1$ voltage.

In accordance with another exemplary embodiment, the method of the present disclosure may be implemented with a synchronizer 3 that includes a control unit 17 (e.g., a computer processor, such as a general-purpose processor and/or an application specific integrated circuit (ASIC)) and a memory 18 (connected or embedded in the control unit 17), wherein the first voltage value $V_1$ is stored. According to an exemplary embodiment, the memory 18 is a non-volatile memory such as a ROM, hard disk drive, flash memory and/or optical memory configured to store computer-readable instructions and/or a computer program that causes the control unit 17 of the synchronizer 3 to perform the operative functions described herein by executing the computer-readable instructions and/or program recorded in the memory 18.

The synchronizer 3 can thus compare the generator voltage (measured through the measuring transformer 4) with the grid voltage (measured through the measuring transformer 5) and drive the generator 1 for synchronizing its frequency with that of the electric grid 2 and regulating its voltage by increasing it towards the voltage of the electric grid 2.

Moreover, the synchronizer (through the control unit 17) causes the breaker 6 to connect the generator 1 to the grid 2 when the voltage of the generator 1 reaches the first value $V_1$ lower than the voltage of the grid 2.

The exemplary embodiments of the method and the synchronizer described above can be implemented according to numerous modifications and variants, all falling within the scope of the inventive concept; moreover all details can be replaced by technically equivalent elements.

In practice, the materials used and the dimensions can be chosen at will according to requirements and to the state of the art.

Accordingly, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE NUMBERS 1 generator
2 grid
3 synchroniser
4, 5 measuring transformer
6 breaker
7 conductors
10 generator voltage
11 grid voltage
13 control line for frequency
14 control line for the voltage (AVR)
17 control unit
18 memory
20 AVR (Automatic Voltage Regulator)
$V_1$ first voltage
$V_g$ grid voltage
$\Delta v$ differential voltage

What is claimed is:

1. A method for synchronizing an electric machine with an electric grid, the method comprising:
   synchronizing a frequency of a generator with a frequency of the grid; and
   regulating a voltage of the generator towards a voltage of the grid and connecting the generator to the grid when the voltage of the generator reaches a first value substantially lower than the voltage of the grid.

2. The method as claimed in claim 1, comprising:
   synchronizing a phase of the generator with a phase of the grid.

3. The method as claimed in claim 2, comprising:
   synchronizing the phase of the generator with the phase of the grid after the voltage of the generator has reached the first voltage value and before the generator is connected to the grid.

4. The method as claimed in claim 1, comprising:
   increasing the voltage of the generator after the generator has been connected to the grid up to voltage of the grid.

5. The method as claimed in claim 1, wherein the first value of the voltage of the generator is lower than the grid voltage by between 5-20%.

6. The method as claimed in claim 5, wherein the first value of the voltage of the generator is lower than the grid voltage by between 10-15%.

7. The method as claimed in claim 1, wherein the electric machine is an electric generator.

8. The method as claimed in claim 1, wherein the first value of the voltage of the generator is lower than the grid voltage by between 10-15%.

9. The method as claimed in claim 1, wherein the first value of the voltage of the generator is lower than the grid voltage by at least 5%.

10. An arrangement of an electric machine and an electric grid, the arrangement comprising:
    a breaker interposed between the electric machine and the electric grid;
    a generator; and
    a synchronizer connected to the generator upstream of the breaker and to the electric grid downstream of the breaker via measuring transformers,
    wherein the synchronizer is connected to the generator to drive the generator, and
    wherein the measuring transformers are two different measuring transformers in that a primary voltage of a first measuring transformer connected to the generator is smaller than a primary voltage of a second measuring transformer connected to the electric grid.

11. The arrangement as claimed in claim 10, wherein the measuring transformers are configured to provide the same secondary voltage with different primary voltages.

12. An arrangement of an electric machine and an electric grid, the arrangement comprising:
    a breaker interposed between the electric machine and the electric grid;
    a generator; and
    a synchronizer connected to the generator upstream of the breaker and to the electric grid downstream of the breaker via measuring transformers, the synchronizer being connected to the generator to drive the generator; and an automatic voltage regulator at least one of comprising and connected to a memory configured to store a voltage substantially lower than the grid voltage, the automatic voltage regulator being configured to drive the generator such that a voltage of the generator is as close as possible to the voltage stored in the memory.

13. The arrangement as claimed in claim 12, wherein the memory configured to store a voltage lower than the grid voltage the grid voltage by at least 5%.

14. An arrangement of an electric machine and an electric grid, the arrangement comprising:
    a breaker interposed between the electric machine and the electric grid; a generator; and
    a synchronizer connected to the generator upstream of the breaker and to the electric grid downstream of the breaker via measuring transformers, the synchronizer being connected to the generator to drive the generator,
    wherein the synchronizer comprises a control unit and a memory at least one of connected and embedded in the control unit, the memory being configured to store a first voltage value, and
    the control unit of the synchronizer is configured to cause the breaker to connect the generator to the grid when a voltage of the generator reaches the first voltage value, which is substantially lower than the voltage of the grid.

15. The arrangement as claimed in claim 14, wherein the memory configured to store a voltage lower than the grid voltage the grid voltage by at least 5%.

16. A method for synchronizing an electric machine with an electric grid, the method comprising:
    synchronizing a frequency of a generator with a frequency of the grid; and
    regulating a voltage of the generator towards a voltage of the grid until the voltage of the generator reaches a target value that is substantially lower than the voltage of the grid;
    regulating the voltage of the generator to said target value and connecting the generator to the grid.

* * * * *